Feb. 28, 1956 G. J. LUBBEN 2,736,798
RECEIVER FOR AT LEAST TWO ULTRAHIGH-FREQUENCY RANGES
Filed Feb. 17, 1953
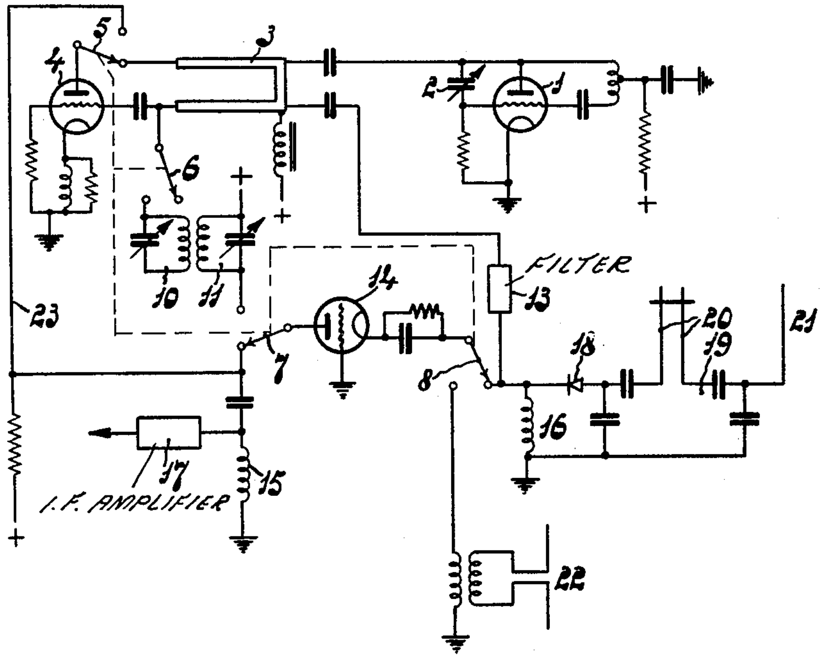
INVENTOR
GERRIT JAN LUBBEN
BY Fred M Vogel
AGENT United States Patent Office 2,736,798

Patented Feb. 28, 1956

2,736,798

RECEIVER FOR AT LEAST TWO ULTRAHIGH-FREQUENCY RANGES

Gerrit Jan Lubben, Eindhoven, Netherlands, assignor to Hartford National Bank and Trust Company, Hartford, Conn., as trustee Application February 17, 1953, Serial No. 337,369

Claims priority, application Netherlands March 3, 1952

6 Claims. (Cl. 250—20)

The invention relates to a receiver for at least two ultra-high-frequency ranges, operating on the superheterodyne principle.

In order to permit the use of a single local oscillator, the frequency of which is variable in both ranges within the same limits, in receivers of the aforesaid kind at the reception in the two ranges, it is known to connect a mixing stage in series, in which the oscillations of the high-frequency range are reduced by a fixed amount. Then in the same way as the oscillations of the lower frequency range, these oscillations are changed in frequency to obtain a constant medium frequency.

Consequently, at the reception in the higher frequency range double frequency changing of the incoming oscillations occurs.

However, this is often undesirable, particularly at the reception of oscillations having frequencies in the range of 400 mc./s. and more, which are particularly of importance for television, in view of the noise occurring in the mixing stages.

It is furthermore known to carry out the frequency changing in receivers by using two local oscillators, the frequency of one of them being variable, an oscillation having fixed frequency being produced in the other. These frequencies are mixed, so that an oscillation having a variable sum frequency or difference frequency is produced, with the use of which the incoming oscillations are changed in frequency to a definite medium frequency.

The invention has for its object to provide a receiver of this kind, which is constructed to be such that it is suitable for the reception of two ultra-high-frequency ranges, more particularly, the ranges used for television, extending from about 50 to 220 mc./s. and 500 to 900 mc./s., the arrangement being such that in both cases tuning may be carried out by varying the frequency of the first-mentioned local oscillator within the same limits. The whole range of 500 to 900 mc./s. can then be covered by providing different values for the fixed oscillator frequency.

The invention has furthermore for its object to construct the receiver in a manner such that optimum use is made of the available tubes in both cases.

The invention consists in that in a receiver of the said kind, at the reception of oscillations in the lower range the frequency of the incoming oscillations is reduced to the said medium frequency only by means of the oscillator having the variable frequency. The oscillator having the fixed frequency is then inoperative.

At the reception of oscillations of the lower frequency range, for example, a high-frequency amplifying stage is, in this case, connected before the mixing stage, whereas at the reception of oscillations in the higher frequency range, the oscillations are changed in frequency without amplification, preferably with the aid of a crystal detector and, moreover, at the reception of oscillations in the higher frequency range the high-frequency amplifier serves as a medium-frequency amplifier.

In a further preferred embodiment the local oscillations having a fixed frequency are produced in a tube which serves as a mixer at the reception in the lower frequency range.

In order that the invention may be readily carried into effect, it will now be described in detail with reference to the accompanying drawing.

Referring to the drawing reference numeral 1 designates a triode operating as an oscillator. The frequency produced may be adjusted with the aid of the variable capacitor 2 to the desired value for the reception of a signal from a transmitter in the higher frequency range. The oscillations produced are supplied through a capacitor and a switching arm 5 to the anode of a triode 4, connected also as an oscillator, the frequency of which is determined by the Lecher system 3, connected between the anode and the grid. The frequency produced by the triode 4 consequently has a constant value, which is determined by the proportions of the system 3. If it is desired to cover the whole range of, for example, 500 to 900 mc./s., this Lecher system may be rendered adjustable or exchangeable. In this case, with three different values of the fixed frequency the whole of said range may be received.

In the tube 4 also takes place a mixing of the adjustable frequency and the constant frequency. The frequency thus obtained which may, for example, be the sum of the first-mentioned frequencies, is supplied through a filter preferably allowing this sum frequency to pass (13) to a second mixing stage comprising a crystal 18. Instead of using a crystal, use may be made of a diode. The oscillations originating from the aerial 21 of the higher frequency range are supplied also to the circuit of the crystal. The circuit 19 can be adjusted by means of the Lecher system 20 to the frequency of the incoming oscillation. As a result of the mixing of the two oscillations an oscillation with medium frequency, preferably the difference frequency is produced across the inductor 16. This frequency may be about 45 mc./s. The inductor 16, together with the available capacitors, constitutes a circuit tuned to this frequency and having a large bandwidth. The upper end is connected through the switch 8 to the cathode of the triode 14. The medium frequency is amplified in the triode 14, the grid of which is connected directly to earth and by means of an inductor 15, which is connected through a switch 7 to the anode of the tube 14, this oscillation is supplied to the intermediate-frequency amplifier 17 of the apparatus. Together with the available capacitors the inductor 15 also constitutes a circuit of large bandwidth, tuned to the medium frequency.

If the switching arms 5, 6, 7 and 8 are moved into the other position, the receiver is adapted to receive oscillations in the lower frequency range. Then the crystal is not operative. The oscillations initiating from the aerial 22 are amplified in the tube 14, which thus operates as a high-frequency amplifier. The amplified high-frequency oscillations are supplied through a bandpass filter of sufficient bandwidth, comprising the intercoupled circuits 10 and 11 and tuned to the incoming frequency, to the grid of the triode 4. In this case the latter serves as a mixing tube for the signal oscillations and the oscillations produced in the oscillator 1. The medium-frequency oscillations are supplied through the conductor 23 to the intermediate-frequency amplifier 17 of the apparatus.

What is claimed is:

1. A receiver for the selective reception of at least two ultra-high-frequency ranges, said receiver operating on the superheterodyne principle, comprising means providing a source of local variable oscillation, means coupled to said variable oscillation source means and including an electron discharge device for providing a source of local constant oscillations for mixing said variable oscillations and said constant oscillations to produce therein an oscillation having a variable algebraic sum frequency during the reception of the high frequency range of said ranges, means coupled to said device for mixing said variable algebraic sum frequency with the oscillations of the higher frequency range of said ultra-high-frequency ranges to reduce the oscillations of said higher frequency range to a definite intermediate frequency, and selective means for rendering said constant oscillation source means inoperative and for applying the incoming oscillations of the lower frequency range of said ultra-high-frequency ranges to said discharge device for mixing therein with the variable oscillations from said first-mentioned means to produce a frequency having a value of said intermediate frequency during the reception of said lower frequency range.

2. A receiver, as set forth in claim 1, further including means for amplifying the incoming oscillations of said lower frequency range during the reception thereof and selective means for connecting said amplifying means as an intermediate frequency amplifier during the reception of said higher frequency range.

3. A receiver, as set forth in claim 2, wherein said means for mixing said variable algebraic sum frequency with the incoming oscillations of said higher frequency range includes a crystal detector.

4. A receiver, as set forth in claim 3, wherein said means for providing a source of local constant oscillations is adjustable to produce a plurality of constant frequency values.

5. A superheterodyne receiver for the selective reception of two ultra-high-frequency ranges, comprising a first local oscillator producing a variable frequency, a second local oscillator including an electron discharge device for producing a constant frequency and constituting means for mixing said variable frequency and said constant frequency therein to produce a beat frequency during the reception of the oscillations of the higher frequency range of said ultra-high-frequency ranges, a first mixing stage including a crystal detector, a second mixing stage including said discharge device, means for mixing said beat frequency with the oscillations of said higher frequency range in said first mixing stage to reduce the oscillations of said higher frequency range to a predetermined intermediate frequency, an amplifying stage coupled to the output of said first mixing stage to amplify therein said intermediate frequency, and selective means for rendering said second oscillator inoperative, decoupling said amplifying stage from said mixing stage, and applying the incoming oscillations of the lower range of said ranges through said amplifying stage to said second mixing stage to mix therein with said variable frequency to produce a frequency having said intermediate frequency value during the reception of said lower frequency range.

6. A receiver for the selective reception of two ultra-high-frequency ranges, said receiver operating on the superheterodyne principle, comprising means providing a source of local variable oscillations; means including an electron discharge device providing a source of local constant oscillations; said device being coupled to said variable oscillation source means, a first mixing stage coupled to said discharge device; means coupled to said first mixing stage to receive the incoming oscillations of the higher range of said two ranges; means for receiving the incoming oscillations of the lower range of said two ranges; an amplifying stage; a second mixing stage including said discharge device; and selective means for coupling in one condition said variable oscillation source means to said constant oscillation source means to mix therein the frequency of said variable frequency source means with said constant frequency source means to produce an oscillation having a variable algebraic sum frequency, said algebraic sum frequency being mixed in said first mixing stage with the oscillations of said higher frequency range of said two ranges to produce a frequency having a predetermined intermediate frequency value therein, and further for coupling said amplifying stage to the output of said first mixing stage to amplify the predetermined intermediate frequency, and in a second condition for coupling said lower range receiving means to said amplifying stage to amplify therein the incoming oscillations of said lower range, and further for coupling said amplifying stage to said second mixing stage to mix therein the amplified incoming oscillations of said lower range with the frequency of said variable oscillation source means to produce a frequency having said predetermined frequency value.

References Cited in the file of this patent

UNITED STATES PATENTS

| | | |
|---|---|---|
| 1,830,242 | Ranger | Nov. 3, 1931 |
| 2,026,759 | Turner | Jan. 7, 1936 |
| 2,141,756 | Linsell | Dec. 27, 1938 |
| 2,509,963 | Collins | May 30, 1950 |
| 2,606,285 | Bataille et al. | Aug. 5, 1952 |

FOREIGN PATENTS

| | | |
|---|---|---|
| 414,769 | Great Britain | Aug. 13, 1934 |